(12) United States Patent
Provenaz et al.

(10) Patent No.: US 11,794,354 B2
(45) Date of Patent: Oct. 24, 2023

(54) METHOD AND INSTALLATION FOR APPLYING A COATING PRODUCT ON A SURFACE

(71) Applicant: EXEL INDUSTRIES, Epernay (FR)

(72) Inventors: Philippe Provenaz, Paris (FR); Didier Chevron, Paris (FR)

(73) Assignee: EXEL INDUSTRIES, Epernay (FR)

(*) Notice: Subject to any disclaimer, the term of this patent is extended or adjusted under 35 U.S.C. 154(b) by 0 days.

(21) Appl. No.: 17/516,484

(22) Filed: Nov. 1, 2021

(65) Prior Publication Data
US 2022/0134574 A1   May 5, 2022

(30) Foreign Application Priority Data
Nov. 5, 2020 (FR) .................................. 2011364

(51) Int. Cl.
| B05D 1/40 | (2006.01) |
| B25J 11/00 | (2006.01) |
| B05C 5/02 | (2006.01) |
| B25J 9/16 | (2006.01) |

(52) U.S. Cl.
CPC .......... B25J 11/0075 (2013.01); B05C 5/027 (2013.01); B05D 1/40 (2013.01); B25J 9/1664 (2013.01); B25J 9/1684 (2013.01)

(58) Field of Classification Search
CPC ........ B05D 1/40; B05C 5/027; B05B 13/0431
See application file for complete search history.

(56) References Cited

U.S. PATENT DOCUMENTS

| 2005/0100680 A1* | 5/2005 | Bustgens | B05B 1/169 427/427.1 |
| 2017/0157828 A1* | 6/2017 | Mandel | B29C 48/21 |
| 2017/0252765 A1* | 9/2017 | Medard | B41J 3/4073 |

(Continued)

FOREIGN PATENT DOCUMENTS

| DE | 4120293 C2 | 8/1995 |
| DE | 102019110564 A1 | 10/2020 |

(Continued)

OTHER PUBLICATIONS

INPI Rapport de Recherche Préliminaire for Patent Application No. FR 2011364, dated Jul. 30, 2021, 2 pp.

(Continued)

*Primary Examiner* — Nathan H Empie
(74) *Attorney, Agent, or Firm* — Soquel Group LLC

(57) ABSTRACT

A method applying a bead of a coating product to a surface by a print head equipped with nozzles, each centered on a central axis, the coating product application moves the print head and the surface relative to each other, by moving the print head along a fixed trajectory relative to the surface without rotating the print head about an axis parallel to the central axes of the nozzles. The method includes selecting certain nozzles for a point of the trajectory based on the trajectory direction at this point, and activating the selected nozzles at this point. The selected nozzles are arranged in a line, or form part of a nozzle group delimited by a line, whose regression line coincides with a line as close as possible to a line perpendicular to the trajectory direction from among lines that can be defined with nozzles of the print head.

6 Claims, 8 Drawing Sheets

(56) References Cited

U.S. PATENT DOCUMENTS

| | | |
|---|---|---|
| 2019/0232321 A1 | 8/2019 | Seubert et al. |
| 2020/0086562 A1 | 3/2020 | Mantell et al. |
| 2020/0215834 A1 | 7/2020 | Bauer |

FOREIGN PATENT DOCUMENTS

| | | |
|---|---|---|
| EP | 1884365 A1 | 2/2008 |
| EP | 3932678 A1 | 1/2022 |
| JP | 2016077971 A | 5/2016 |
| JP | 201964176 A | 4/2019 |
| KR | 1020080068528 A | 7/2008 |
| WO | 200185352 A2 | 11/2001 |
| WO | 2014060005 A1 | 4/2014 |

OTHER PUBLICATIONS

Rapport de Recherche Europeenne, Patent No. EP 21206353, dated Mar. 21, 2022, 3 pp.
JP201677971A EPO Translation.
JP201964176A EPO Translation.

\* cited by examiner

METHOD AND INSTALLATION FOR APPLYING A COATING PRODUCT ON A SURFACE

CROSS-REFERENCE TO RELATED APPLICATION

This application claims priority of French Patent Application No. 20 11364, filed on Nov. 5, 2020.

FIELD OF THE INVENTION

The invention relates to a method for applying a bead of coating product to a surface to be coated. The invention also relates to an installation for applying such a bead to such a surface.

BACKGROUND OF THE INVENTION

Within the meaning of the present invention, a coating product is a product intended to be applied to a surface by forming a layer thereon.

A coating product may be an adhesive or putty in particular, with a relatively high viscosity, or a paint, ink or varnish.

Within the meaning of the present invention, a bead is a layer applied to a surface which has a width strictly less than its length and a thickness strictly less than its width. For example, the thickness of the bead may be a few millimeters, while its width is between 5 and 100 millimeters and its length may be greater than 1 meter.

To enable application to three-dimensional surfaces, an application head is sometimes mounted on the wrist of a multi-axis robot. For other applications, the application head is fixed and an object that defines the surface to be coated is moved in front of this head by a multi-axis robot. The bead is most often generated by extruding or ejecting the coating product through a calibrated slot to create a flat pattern. The relative movement of the application head and the object that defines the surface to be coated must be perpendicular to the direction of the slot. The bead width is generally fixed and depends on the coating product feed pressure and the slot geometry. Changing the orientation of the application head relative to the surface to be coated may result in a modification in bead width. Changing the orientation of the application head relative to the surface to be coated, or following a warped part of the surface, or adjusting the bead width, requires dedicating a specific robot axis to this function or adding an axis to the robot. This increases the complexity of the robot and consequently the cost of an installation for applying a bead.

This problem has been addressed by using application heads with swirling motion, as contemplated in WO-A-2001/85352. The swirling motion requires pneumatic and/or electrical means of driving the material, which is relatively complex.

On the other hand, moving a print head in translation without rotation is known from KR-A-101355906, to form a bead in the form of a rectangular frame, which does not fully satisfy in the corners when two nozzles are provided and which achieves overconsumption of coating product when four nozzles are provided in a rhombus. Moreover, this material does not allow for easy application of a complex geometry bead, especially on a warped surface.

According to another approach, arranging nozzles on a print head in such a way that at least one of them is not aligned with another nozzle during application is known from US-A-2020/086562. This prevents gaps in a product layer, but achieves overconsumption of coating product in the case of bead application.

On the other hand, EP-A-1884365 teaches applying a coating product by means of a print head that is not necessarily rotated based on the geometry of a part to be coated. This approach is not easily adaptable to actual part geometry.

SUMMARY OF THE DESCRIPTION

The invention intends to remedy these drawbacks by proposing a new method for applying a coating product bead to a surface to be coated, whereby a bead of uniform or quasi-uniform thickness may be applied, with a well-defined geometry, even where this bead has a complex and/or warped shape.

For this purpose, the invention relates to a method for applying a coating product bead to a surface to be coated by means of a print head equipped with several nozzles, each nozzle being centered on a central axis, the application of coating product taking place by moving the print head and the surface to be coated in relation to each other by relative print head movement along a fixed trajectory in relation to the surface, without rotating the print head about an axis parallel to the central axes of the nozzles. This method includes selecting certain nozzles for a point of the trajectory, based on the trajectory direction at this point and/or based on a previous trajectory point already reached by the print head and the trajectory direction at this previous point, and activating the selected nozzles at this point. According to the invention, the selected nozzles are arranged in a line or form part of a nozzle group bounded by a line whose regression line coincides with a line perpendicular to the trajectory direction or, of the lines that may be defined with the print head nozzles, as close as possible to a line perpendicular to the trajectory direction.

Thanks to the invention, the selection of certain print head nozzles defined by means of the line whose linear regression line coincides with or is as close as possible to a line perpendicular to the trajectory direction, makes it possible to adapt the number and arrangement of the print nozzles activated based on the trajectory direction to be followed, thus making it possible to apply the coating product only from the nozzles best placed for this purpose. The nozzle selection and activation may be varied along the trajectory, in order to dynamically adapt the application of product, based on the trajectory. Thus, the amount of coating product applied is optimized, as is the geometry of the bead deposited on the surface to be coated.

According to advantageous but non-mandatory aspects of the invention, this method may incorporate one or more of the following features, taken in any technically permissible combination:

- The print head nozzles are arranged in rows and columns, while during the selection step, the nozzles of a portion of certain rows and/or a portion of certain columns are selected together for activation.
- The print head nozzles are arranged in at least one arc of a circle, while during the selection step, the nozzles of a portion of the arc of a circle are selected together for activation.
- The width of an area coated by a selected and activated nozzle is adapted according to the distance between this area and an adjacent area coated by another nozzle.

The width of the area coated is adapted by varying an activation frequency of a feeder of the selected and activated nozzle.

The width of the area coated by the selected, normally activated nozzle is reduced locally to zero so as not to interfere with an adjacent coating product area or areas.

The width of the print head, measured perpendicular to the direction of travel, is greater than or equal to the width of the bead to be applied, the width of the bead also being measured perpendicular to the direction of travel, while, among the nozzles selected during the selection, only those nozzles arranged facing the track of the bead on the surface to be coated are activated.

Information on the relative direction and speed of the print head in relation to the surface to be coated is supplied to the electronic control unit by a robot control unit allowing the relative print head movement and the surface to be coated.

Information on the relative direction and speed of the print head in relation to the surface to be coated is provided to the electronic control unit by an accelerometer or an inertial unit on board a robot allowing the relative print head movement and the surface to be coated.

According to another aspect, the invention relates to an installation for applying a bead of coating product to a surface to be coated, this installation including a print head equipped with several nozzles, each centered on a central axis, a robot allowing the relative movement of the print head and the surface, without rotation about an axis parallel to the central axes of the nozzles, along a fixed trajectory in relation to the surface, as well as a control unit for each nozzle. According to the invention, the control unit is configured to select and to activate certain print head nozzles at a trajectory point based on the trajectory direction at that point, at least, and/or based on a previous trajectory point already reached by the print head and the trajectory direction at that previous point.

This installation makes it possible to implement the method of the invention and achieves the same advantages as the latter.

Advantageously, the print head nozzles are arranged on at least one arc of a circle, whereas preferably a body of the print head has a circular cross section.

BRIEF DESCRIPTION OF THE DRAWINGS

The invention will be better understood and other advantages thereof will become clearer in the light of the following description of six embodiments of a method and installation according to its principle, given only by way of example and made with reference to the appended drawings in which.

DETAILED DESCRIPTION

Figure 1:
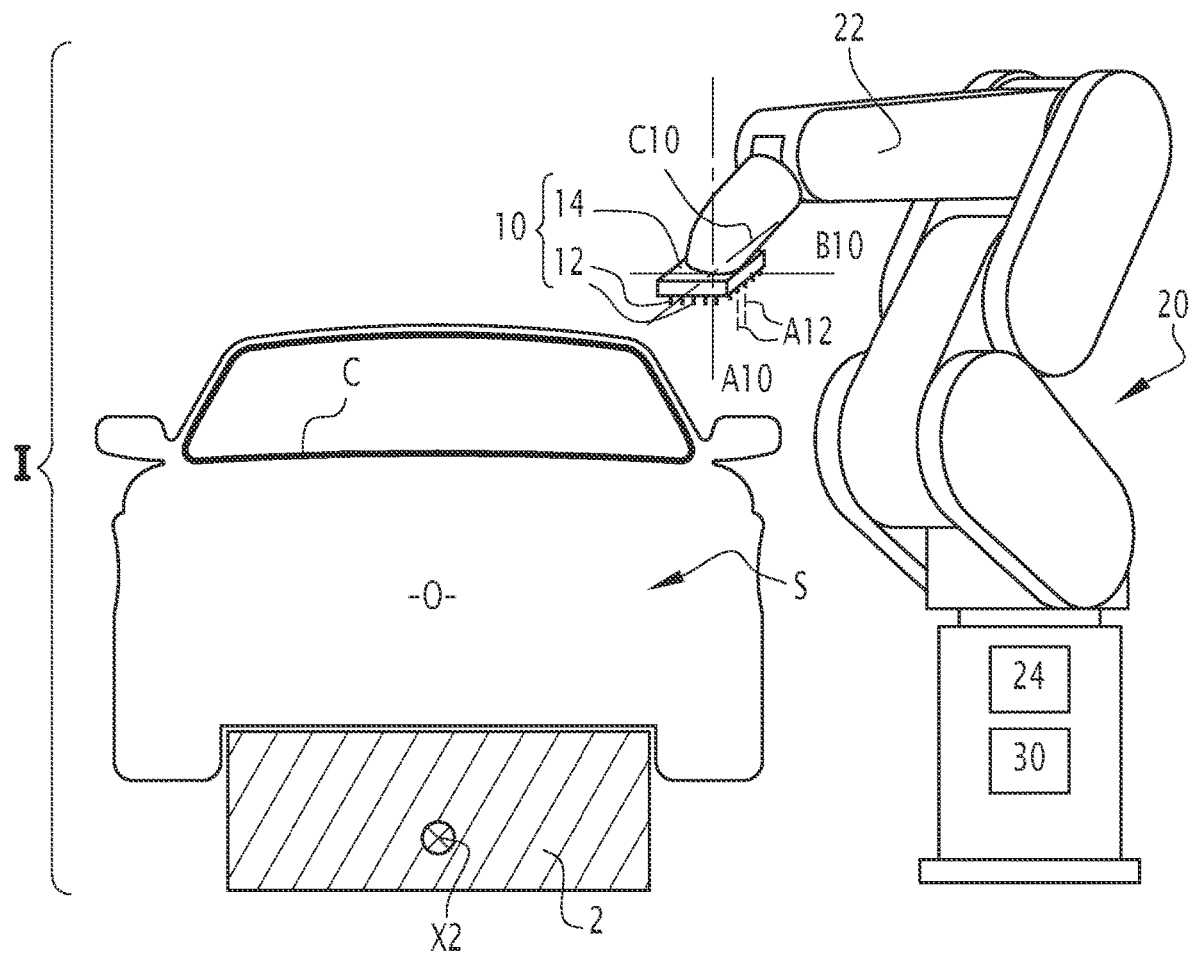
FIG. 1 is a schematic representation in principle of an installation according to the invention, configured to implement a method according to the invention, viewed from the front.
Figure 2:
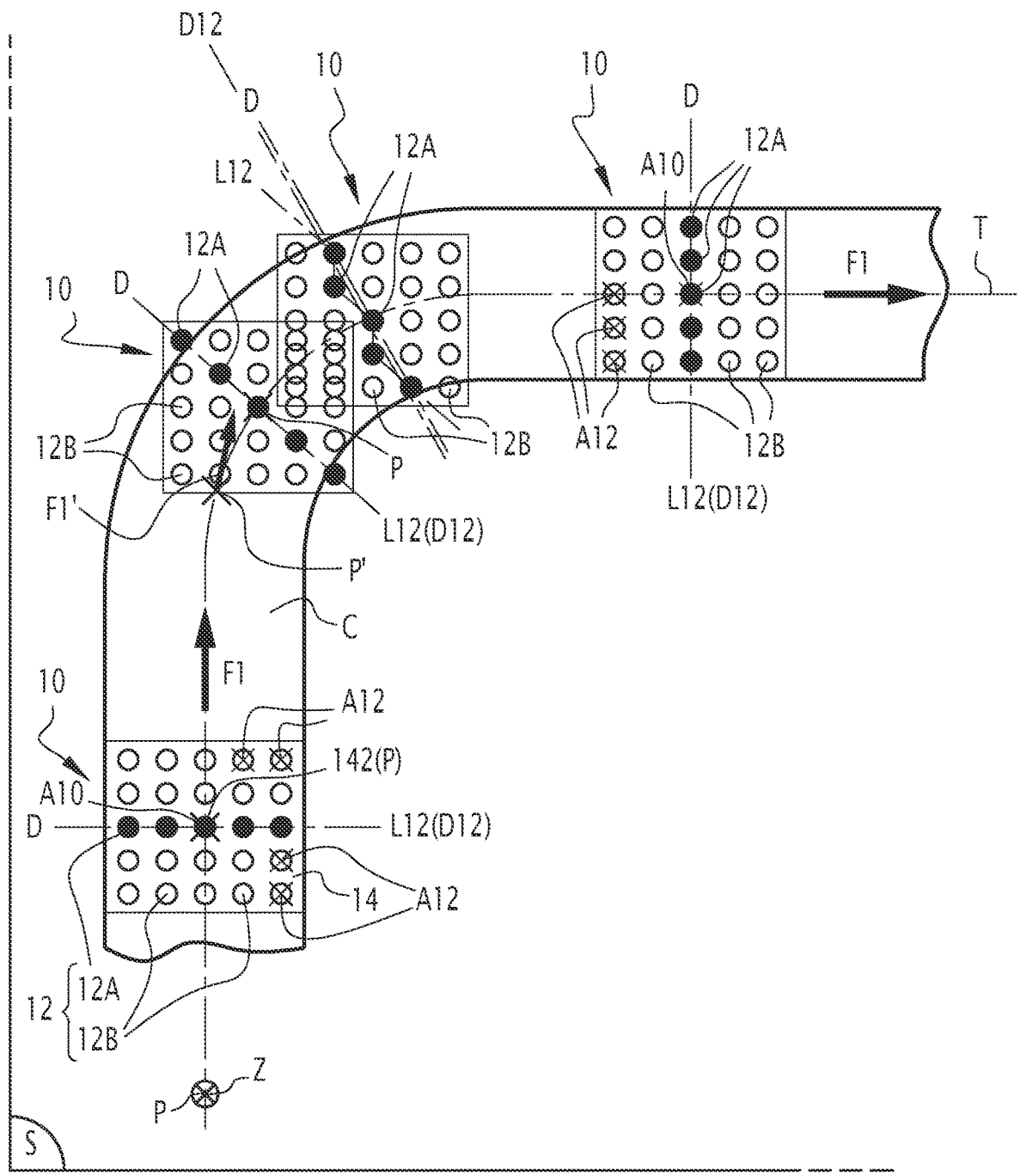
FIG. 2 is a schematic representation in principle of part of a mastic bead being applied by means of the installation of FIG. 1 and according to a first application method according to the invention.

The installation I shown in FIGS. 1 and 2 is provided for applying a bead C of adhesive to objects O, which are motor vehicle bodies in the example. More precisely, in this example, installation I allows the creation of a bead C of adhesive for fixing a windshield on a surface S of the bodywork of a motor vehicle.

In a variant, the objects to be coated may be parts of motor vehicle bodywork, such as doors or bumpers or, more generally, any object that may be coated, such as part of an aircraft body or a body of a household appliance, with these examples not being limiting.

In a variant, the product applied is a paint. In this case, bead C may be a contrasting color strip on the body of a motor vehicle.

Installation I includes a conveyor 2 provided to move objects O along a conveying axis X2 perpendicular to the plane of FIG. 1.

Installation I also includes an application head 10 mounted at the end of an arm 22 of a multi-axis robot 20 arranged in the vicinity of conveyor 2.

Installation I also includes an electronic control unit 24 capable of controlling robot 20, and an electronic control unit 30 capable of controlling application head 10 carried by it.

Application head 10 includes a plurality of nozzles 12 that are identical to each other and mounted on one face of a rigid parallelepiped body 14 of the print head. By way of example, the nozzles may be of the type described in DE 10 2009 029 946 A1. Other nozzle types are also conceivable, based on the nature, in particular the viscosity, of the coating product to be applied.

A central axis of print head 10 is denoted A10, which passes through the center of body surface 14 on which nozzles 12 open, and which is oriented towards the surface S to be coated when the print head is activated to apply the coating product. The central axis of a nozzle 12 is denoted A12, which is located at the center of the coating product jet ejected from that nozzle. Each nozzle 12 is centered on its central axis A12. Axes A12 are parallel to axis A10.

Electronic control unit 30 is configured, in particular, to control activation of individual nozzles 12. Electronic nozzle control unit 30 is not necessarily arranged in robot 20.

Information about the relative direction and relative speed of print head 10 in relation to surface S to be coated is provided to electronic control unit 30 by control unit 24 of robot 20.

In a variant, control units 24 and 30 may coincide.

As is more particularly apparent from FIG. 2 where surface S to be coated is flat and parallel to the plane of FIG.

2, when it is necessary to create a coating product bead C on a surface S, such as the surface of a motor vehicle body O in the example of FIGS. 1 and 2, print head 10 is moved along a trajectory T. This trajectory T is parallel to surface S and thus flat in this example, and oriented in the direction of arrows F1 in FIG. 2, which represent the trajectory direction at different points P. Trajectory T is separated from surface S to be coated by a distance that constitutes the distance for applying the coating product.

In practice, trajectory T extends substantially opposite the center of bead C to be made and may be curved. For example, in FIG. 2, the trajectory T includes a curve that corresponds to a curved area of bead C. Trajectory T is a curve along which the print head travels to apply bead C. This curve may be flat, as shown in FIG. 2, or warped; i.e. three-dimensional.

In FIG. 2, print head 10 is represented in four positions along trajectory T; namely, a first position, at the bottom left of FIG. 2, facing a straight section of cord C, a second position at the entry of the curve, a third position at the exit of the curve, and a fourth position facing a straight section of cord C defined after the curve, in the direction of arrows F1, according to which print head 10 follows trajectory T.

As shown in FIG. 2, there are 25 nozzles, 12 on the body, arranged on a square surface in an array of five rows and five columns of five nozzles each, with their respective axes A12 perpendicular to the plane of FIG. 2. In FIG. 1, the nozzles are shown projecting from body 14. However, they can be totally integrated into body 14 and flush with the square surface.

In order to simplify and optimize the axes of robot 20, the movement of body 14 of print head 10 along trajectory T takes place by a movement that is a combination of straight translation and circular translation; i.e., a translation movement of body 14 along trajectory T that is curved, without rotation of body 14 about its central axis A10, which passes through its geometrical center 142, or an axis, parallel to axis A10 and passing through another point of body 14.

In FIG. 2, black nozzles 12 represent active nozzles during movement of body 14 along trajectory T, while white nozzles represent inactive nozzles. "Active" means that a nozzle ejects coating product as print head 10 moves. "Inactive" means that a nozzle does not eject coating product during this movement.

In order to ensure proper application of the coating product intended to form bead C, nozzles 12 are selected based on the location of print head 10 along trajectory T; i.e., point P of the trajectory in which a given point of the print head is located, in the example its geometric center. In practice, determination of the location of print head 10 along trajectory T takes place by determining the position of center 142, or such other notable point of body 14, along that trajectory.

Trajectory T is assumed known to electronic control unit 30 at any point P, particularly in relation to its direction, defined as a tangent to the trajectory at that point and represented by arrows F1. At a trajectory point P, unit 30 is able to determine a straight line D perpendicular to the trajectory direction, as shown for the four print head positions visible in FIG. 2.

In a variant, trajectory T may not be known to electronic unit 30 beforehand, but it is known to electronic control unit 24 of robot 20. In the case of a print head 10 mounted on robot 20, its direction and speed of movement may be determined by mounting an accelerometer or a central inertia unit with the print head. The accelerometer or the central inertia unit makes it possible to know the print head movement, thus to reconstruct trajectory T followed by the print head locally, in real time. It is also possible in this case to determine a line D perpendicular to trajectory direction T at each point P of the trajectory.

In all cases, an axis Z directed from the center of the print head towards surface S to be coated is defined at a point P on the path. Axis Z is perpendicular to the plane of FIG. 2. The fact that movement of body 14 of print head 10 along trajectory T takes place by a translation corresponds to the fact that this movement takes place without rotation about the Z axis.

Unit 30 selects, from among nozzles 12, a nozzle group whose track on bead C is the closest possible to line D. The nozzles of this nozzle group are denoted 12A and the other nozzles of the print head are denoted 12B. In practice, nozzles 12A are arranged so that the regression line associated with the position of nozzles 12A is as close as possible to line D. Here, nozzles 12A are arranged in a line L12.

In the example in FIG. 2, in the first print head position, the selected nozzle group 12A corresponds to a row of nozzle array 12 formed on body 14. Line L12 is therefore the average line of this row, which is a straight line. In the second position, the selected nozzle group 12A corresponds to a diagonal of nozzle array 12. Line L12 is therefore the average line of this diagonal, which is also a straight line. In the third position, the group of selected nozzles 12A represents a broken line L12 on the surface of body 14, with broken line L12 having regression line D12, that is closest to line D perpendicular to trajectory T, from among the lines that are possible to create in nozzle array 12. In the fourth position, the selected nozzle group 12A corresponds to a column of nozzle array 12. Line L12 is therefore the average line of this column and is also a straight line. In the first, second and fourth print head positions shown in FIG. 2, line L12 coincides with its regression line D12 and with straight line D. In the third position, broken line L12 is approximated by regression line D12, which is parallel to, but not coincident with, line D.

In the two straight parts of bead C corresponding to the first and fourth positions shown in FIG. 2, the two selected nozzle groups 12A are formed by two perpendicular lines of nozzles, namely a row of nozzles 12 in the first configuration and a column of nozzles 12 in the second configuration.

In this embodiment, all selected nozzles 12A are activated at a point P to apply the coating product. Therefore, nozzles 12A are black in FIG. 2.

Thus, the method including selecting certain nozzles, namely nozzles 12A at a point P, based on direction F1 of trajectory T at that point, after activating these nozzles, allows the coating product to be applied efficiently and economically, with enough nozzles in use to avoid uncoated areas, or "gaps" in bead C, but without overusing coating product or making the bead too thick.

According to one embodiment shown only for the second position of print head 10 in FIG. 2, determination of nozzles 12A occurs by taking into account a trajectory point P' previously reached by print head 10 and the trajectory direction F1' at this previous point P'. This approach makes it possible to know which nozzles 12A were active at the previous point P' and which nozzles 12A should be activated at the point P. This variant is also applicable to other print head positions along the trajectory T and other embodiments described below.

The variant, using previous point P' and direction F1', may be implemented instead of, or in addition to, the basic approach using only direction F1 at point P.

The selection of nozzles 12A within nozzle array 12 may take place in advance of making bead C, as soon as trajectory T is known. In other words, selecting nozzles 12A may take place prior to using robot 20 and application head 10.

In this case, it is then possible to also take into account surface area S when selecting nozzles 12A. This results in a modification of the linear regression algorithm which calculates straight line D12 from line L12, taking into account the impact of the nozzles on surface S.

Moreover, it is then possible to provide beads with right angles, made with a rectangular array, without having an overlap in the inner corner due to the 90 degrees change of direction, for example.

In a variant, selection and activation follow each other immediately. In particular, selection of nozzles 12A to be activated may take place at each advance of arm 22 of robot 20 based on trajectory T that is stored in electronic control unit 30. It is possible to know real time speed information on the robot tool center according to axes of an orthogonal reference frame linked to the part to be coated. By integrating these speed values, variations in the print head position in relation to the part may be deduced. This approach makes it possible to take into account the real print head position while applying bead C and to take into account a possible adjustment of trajectory T based on this real position.

The application programmer may choose how to determine which nozzles should constitute nozzles 12A to be activated within nozzle array 12, and depends on how to approximate a straight line D perpendicular to trajectory T by means of a nozzle line. To do so, it is possible to use regression methods (linear or not, polynomial, etc.) involving error calculations (quadratic or not, least squares methods, etc.).

Figure 3:
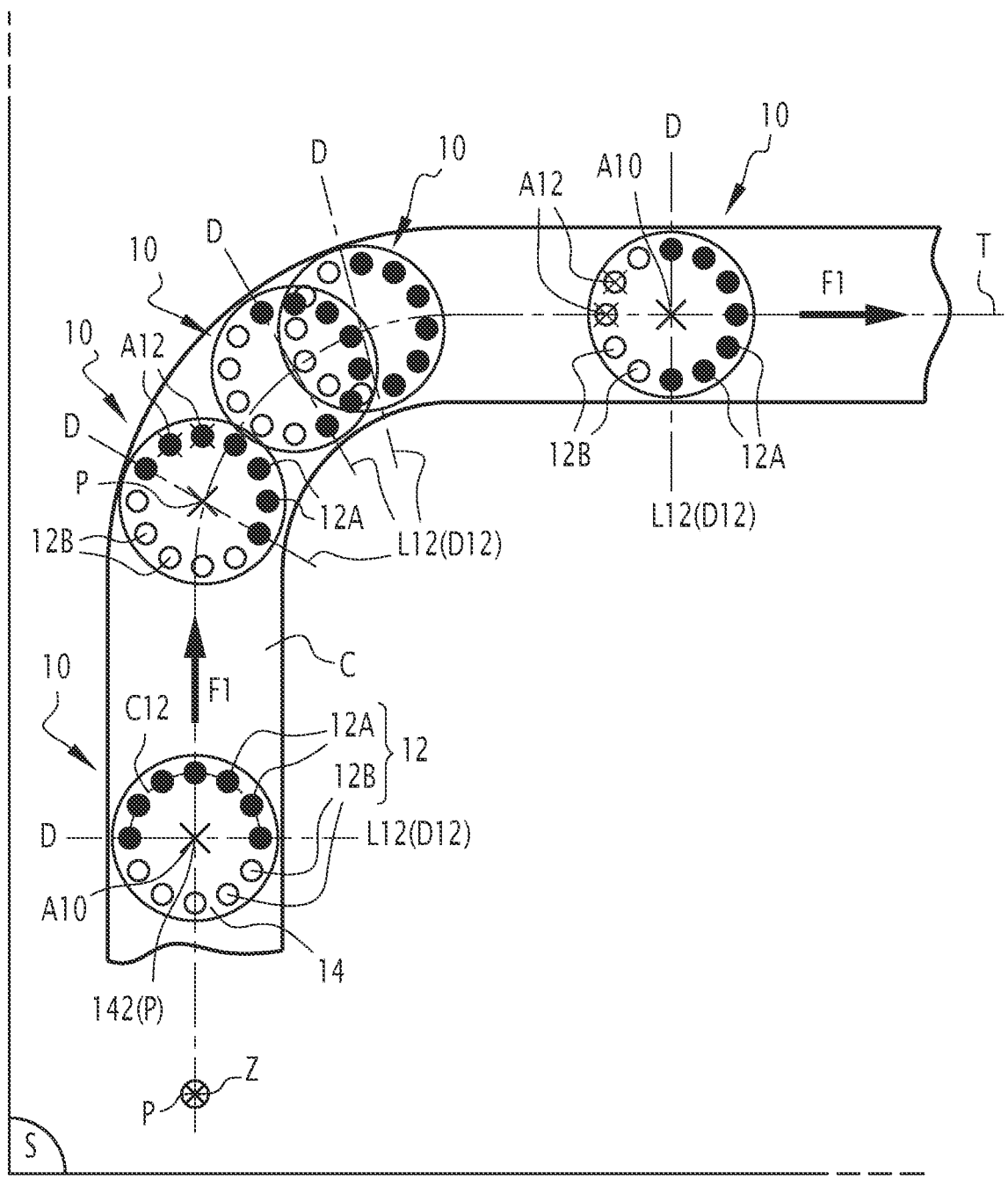
FIG. 3 is a representation analogous to FIG. 2 for an installation and application method according to a second embodiment of the invention.

In the second to fifth embodiments of the invention shown in FIG. 3 and following, the elements analogous to those of the first embodiment bear the same references.

Surface S to be coated is again assumed to be plane and parallel to the planes of FIG. 3 and following, and print head movement along trajectory T, defined as in the first embodiment and also plane, takes place by a combination of translations parallel to surface S, without rotation about central axis A10 of the print head, defined as in the first embodiment, or an axis parallel thereto, or axis Z defined as in the first embodiment.

In the following, we will mainly describe what distinguishes these embodiments from that of FIGS. 1 and 2, with it specified that the methods described with reference to FIG. 3 and following may be implemented with the installation I of FIG. 1, provided that the latter is adapted, in particular in relation to print head structure 10.

In the embodiment shown in FIG. 3, body 14 of print head 10 is cylindrical and circular in cross-section and holds twelve nozzles 12 distributed over a disk-shaped surface. No nozzles are positioned at geometric center 142 of body 14 of print head 10. FIG. 3 shows five positions of application head 10, for which straight lines D perpendicular to direction F1 of trajectory T are marked at trajectory points P, corresponding to these five positions.

Nozzles 12 are distributed on a circle centered on geometric center 142 of body 14, which is considered aligned with a point P of trajectory T. In this example, selected nozzles 12A are the nozzles located, in relation to line D, on the front of the latter in the direction of progression of print head 10 along trajectory T. Thus, a line L12 that passes through selected nozzles 12A closest to other nozzles 12B not selected is a diameter of body 14 of print head 10 in this example, with this diameter being superimposed on line D at each point P of the trajectory. Selected nozzles 12A also include the nozzles located on line L12.

Line L12 delimits the set of nozzles 12A in relation to nozzles 12B. Since this line is a diameter of body 14, it coincides with its regression line D12.

Nozzles 12B not selected are behind line L12 and straight line D in the direction of progression of print head 10 along trajectory T.

In this embodiment, selected and activated nozzles 12A are distributed over an arc of a circle C12 located, in relation to line L12, on the front of body 14 being moved along trajectory T, which allows for an even application of the coating product over the width of bead C, without it being too thick, which could be the case if all print head nozzles 10 were activated along the entire trajectory.

Since the movement of body 14 of print head 10 along trajectory T takes place by straight or circular translation, nozzles 12A selected and activated for application of the coating product intended to form bead C change between the five configurations shown in FIG. 3.

Figure 4:
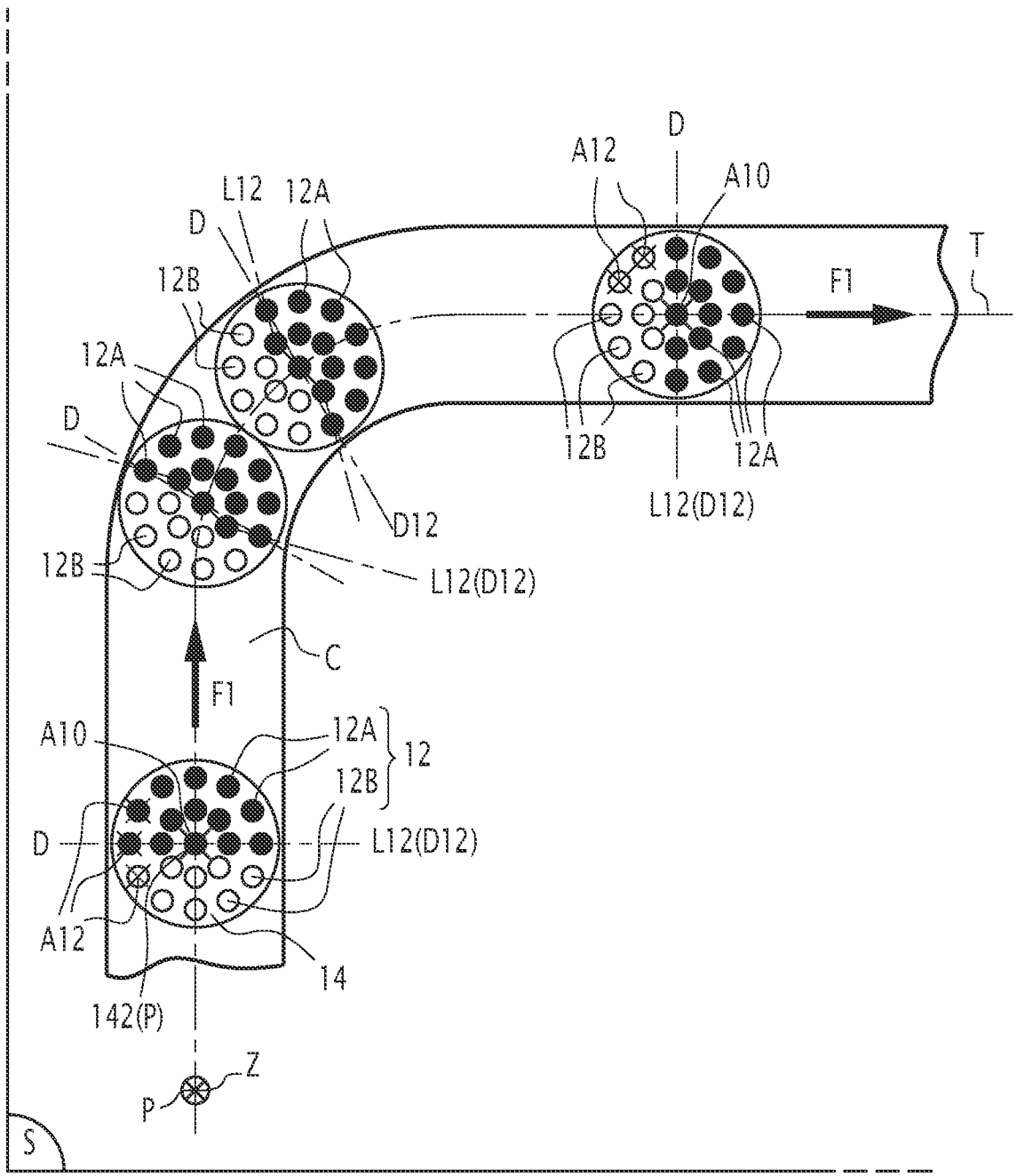
FIG. 4 is a representation analogous to FIG. 2 for an application installation and method according to a third embodiment of the invention.

In the embodiment shown in FIG. 4, body 14 of print head 10 is also cylindrical and circular in cross-section and centered on a geometric center 142 that corresponds to a nozzle 12, as in the first embodiment.

In this embodiment, nozzles 12 are distributed over the entire surface of body 14 and not arranged in a single circle. In practice, the nozzles are distributed over a disk-shaped surface in a plurality of concentric circles, centered on center 142.

Also in this example, based on the straight and circular translational print head movement 10 along trajectory T, different nozzle groups 12A are selected based on direction F1 of trajectory T. Nozzle group 12A is delimited in relation to other nozzles 12B by a line L12, which takes into account a line D perpendicular to trajectory direction T at each point P of trajectory T.

In the example, selected nozzle group 12A corresponds approximately to a half disk, with selected nozzles 12A arranged on arcs of a circle. In the first and fourth positions, where the print head moves in a straight line, line L12 is straight and extends along a diameter of body 14, being superimposed on straight line D at the considered trajectory point P. In the second and third positions, which correspond respectively to making a turn and the exit from this turn, the selected nozzles arranged at the border with nozzles 12B not selected extend along line L12, which is curved; i.e., not straight, but which approximates straight line D perpendicular to trajectory T. In this example, line L12 in the second and third positions is a broken line formed by a succession of straight line segments, as in the third position of FIG. 2. Here, line L12 is chosen from among the lines that it is possible to define with nozzles 12 on body 14, as the one whose regression line D12 is as close as possible to line D. As in the first embodiment, the programmer may choose the approximation method.

In this embodiment, print head 10 holds twenty-one nozzles.

Figure 5:
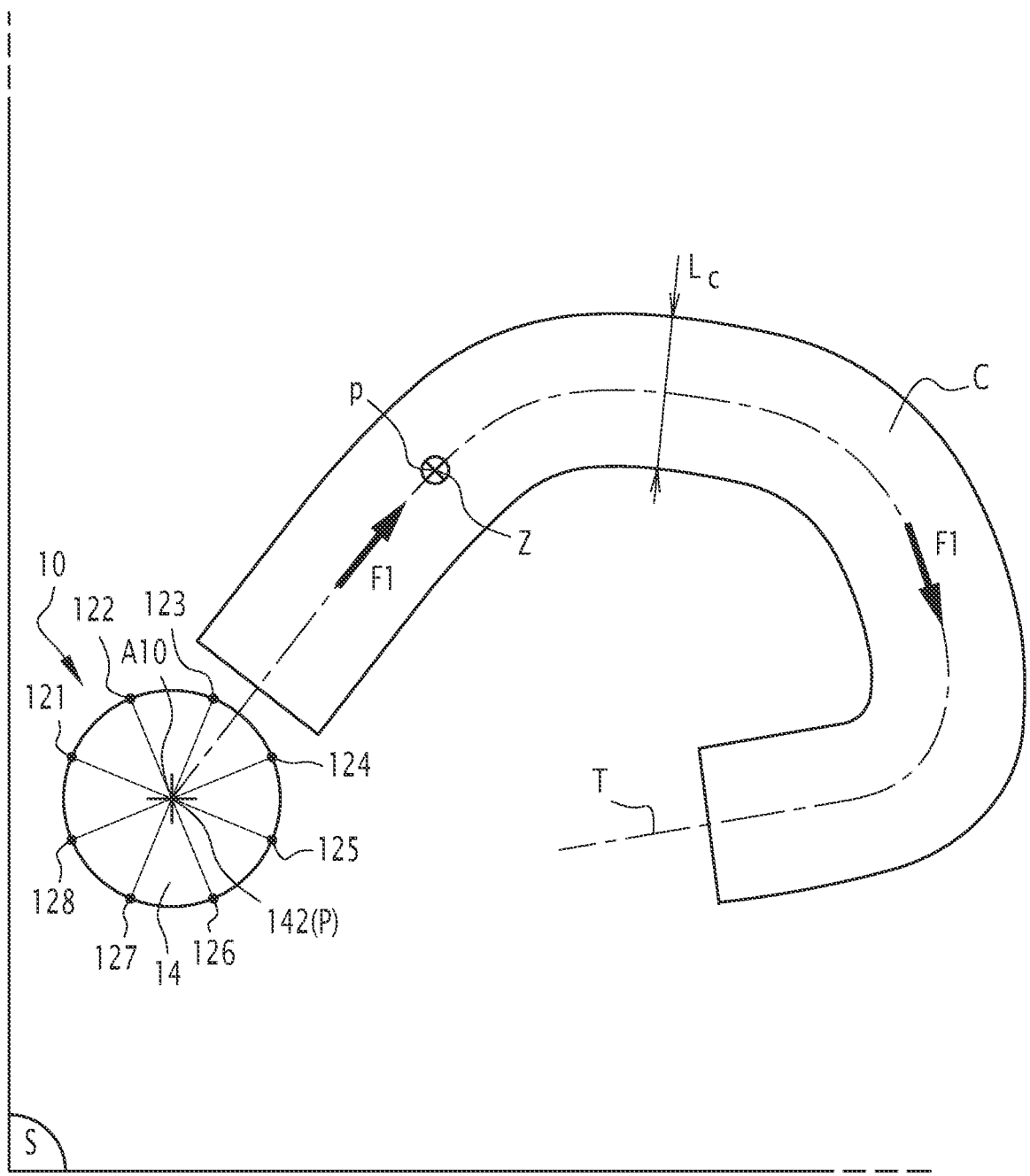
FIG. 5 is a schematic representation of an application installation, showing a bead to be made and an application head, prior to implementation of a fourth method according to the invention.
Figure 6:
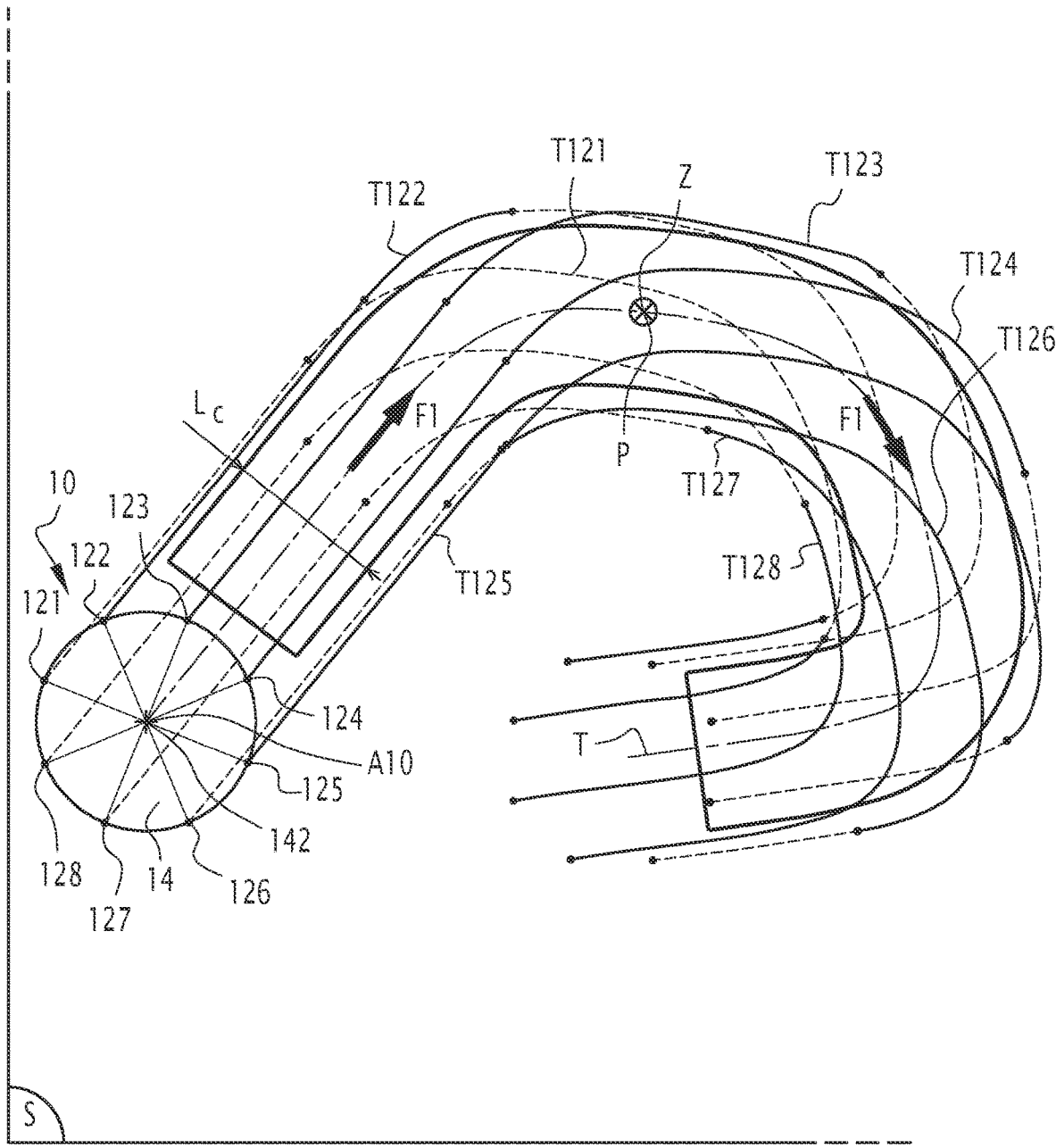
FIG. 6 is a representation of the track of the nozzles in relation to the bead in the installation of FIG. 5, during the implementation of the fourth method according to the invention.

FIGS. 5 and 6 show the case of creation of a bead C by means of a print head 10 whose body 14 is cylindrical and circular in section, and holds eight nozzles 12 distributed around the periphery of a disk-shaped surface. The geometric center of body 14 is denoted as 142, with the geometric center being moved along a predefined trajectory T, whose direction of advance is marked by arrows F1, as in the preceding embodiments.

The geometry of trajectory T is such that cord C has a complex shape, with a first relatively wide turn and a second relatively tight turn.

As may be seen in FIG. 6, where the solid lines represent the track of selected nozzles 12A and the dashed lines represent the track of non-selected nozzles 12B, it is possible to select the nozzles based on the direction of advance of body 14 along trajectory T.

The eight nozzles 12 are marked with distinct reference numbers, from 121 to 128. In FIG. 6 trajectory T12$i$ of a nozzle 12$i$ is marked, with i between 1 and 8. On each trajectory T12$i$, the track of nozzle 12$i$ is represented in dotted lines when nozzle 12$i$ is not selected, and therefore is of the 12B type in the sense of the preceding explanations, and in solid lines when this nozzle is selected, and therefore of the 12A type in the sense of the preceding explanations. For example, trajectory T121 shows that nozzle 121 is selected only from the start of the terminal straight section of trajectory T, after the second turn. In contrast, trajectory T122 shows that nozzle 122 is selected at the start of trajectory T, until making the first turn, and then into the last straight section, after the second turn. Trajectory T123 of nozzle 123 shows that it is selected in the first straight section of trajectory T, on the main part of the first turn, then deselected. Trajectory T124 of nozzle 124 shows that it is selected at the start and up to the middle of the portion between the first and second turns of trajectory T, then deselected. Trajectory T125 of nozzle 125 shows that it is selected until starting the second turn. Trajectory T126 of nozzle 126 shows that it is selected from starting the first turn until exiting from the second turn. Trajectory T127 of nozzle 127 shows that it is selected from exiting the first turn to the end of the movement. Trajectory T128 of the eighth nozzle shows that it is selected from the end of the first turn to the end of the movement.

Nozzles 12$i$ that constitute nozzles 12A selected to be activated at a point P of trajectory T are understood in this case to be the nozzles located towards the front of print head movement 10, according to an approach comparable to that envisaged for the second embodiment, but with a different number of nozzles and a more elaborate implementation due to the relatively complex geometry of bead C. Thus, in this example, at the start of the trajectory, selected nozzles 12A are nozzles 122 to 125. At the entrance to the first turn, selected nozzles 12A are nozzles 122 to 126. Between the first and second turns, selected nozzles 12A are nozzles 125, 126 and 127. At the exit of the second turn, selected nozzles 12A are nozzles 121, 122, 127 and 128.

The width of bead C to be applied is denoted LC, measured perpendicular to direction F1 of trajectory T, assuming that this width is constant. The useful print head width, i.e., the installation width of nozzles 12$j$ on body 14, is denoted L10, also measured perpendicular to trajectory direction T. Here, width L10 is equal to the diameter of body 14.

FIG. 6 shows that certain nozzles 12$i$ may be selected at a point P of trajectory T, since their trajectory T12$i$ is in a continuous line, when they are not facing the track of bead C to be made. This is the case, for example, of nozzles 122 and 125 in the first part of the trajectory, before the first turn. This is due to the fact that width L10 is strictly greater than width LC.

In this case, not all selected nozzles 12A are necessarily expected to be activated. An additional control may be provided in which it is verified that a given nozzle 12$i$, which is one of selected nozzles 12A, is indeed facing the track of bead C on surface S to be coated; i.e., the surface area S to be coated that is intended to be coated by bead C. If this is the case, activation of nozzle 12$i$ in question is validated and the nozzle is activated. If not, this activation is prevented.

In the example shown in FIG. 6, nozzles 126, 127 and 128 are selected between the two turns but are not activated, since the coating product coming from these nozzles would fall outside the track of bead C on surface S to be coated. The same applies to nozzles 122, 126 and 127 after the second turn.

Thus, the invention makes it possible to use the same print head 10 to apply beads C of different widths LC, the widths LC being less than or equal to the useful print head width L10, since activation of selected nozzles 12A takes into account width LC of bead C at each point P of trajectory T.

If width LC varies along bead C, the verification considered above is adapted.

Figure 7:
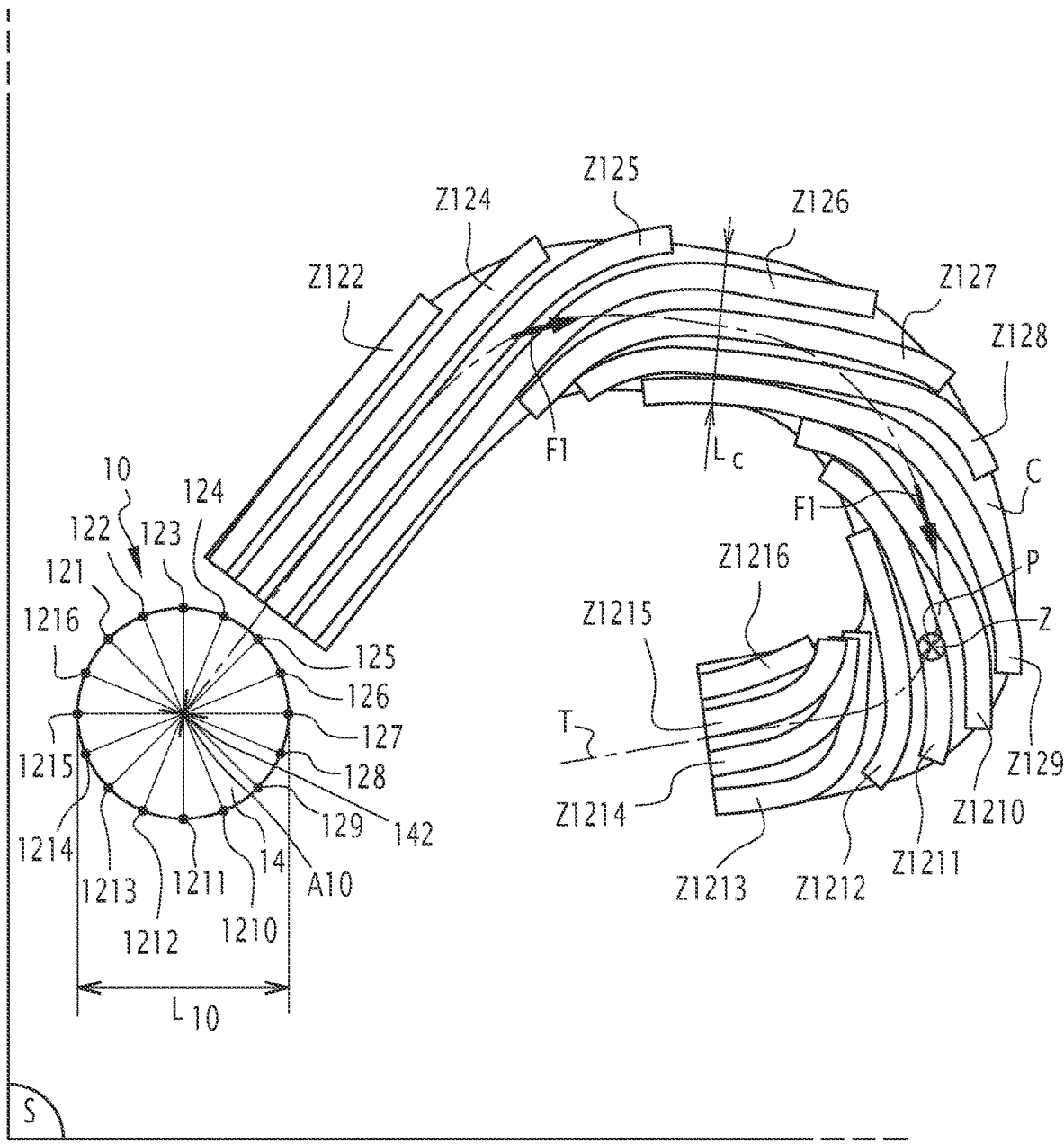
FIG. 7 is a schematic representation of a fifth application method implemented to create a bead in a fifth installation according to the invention.
Figure 8:
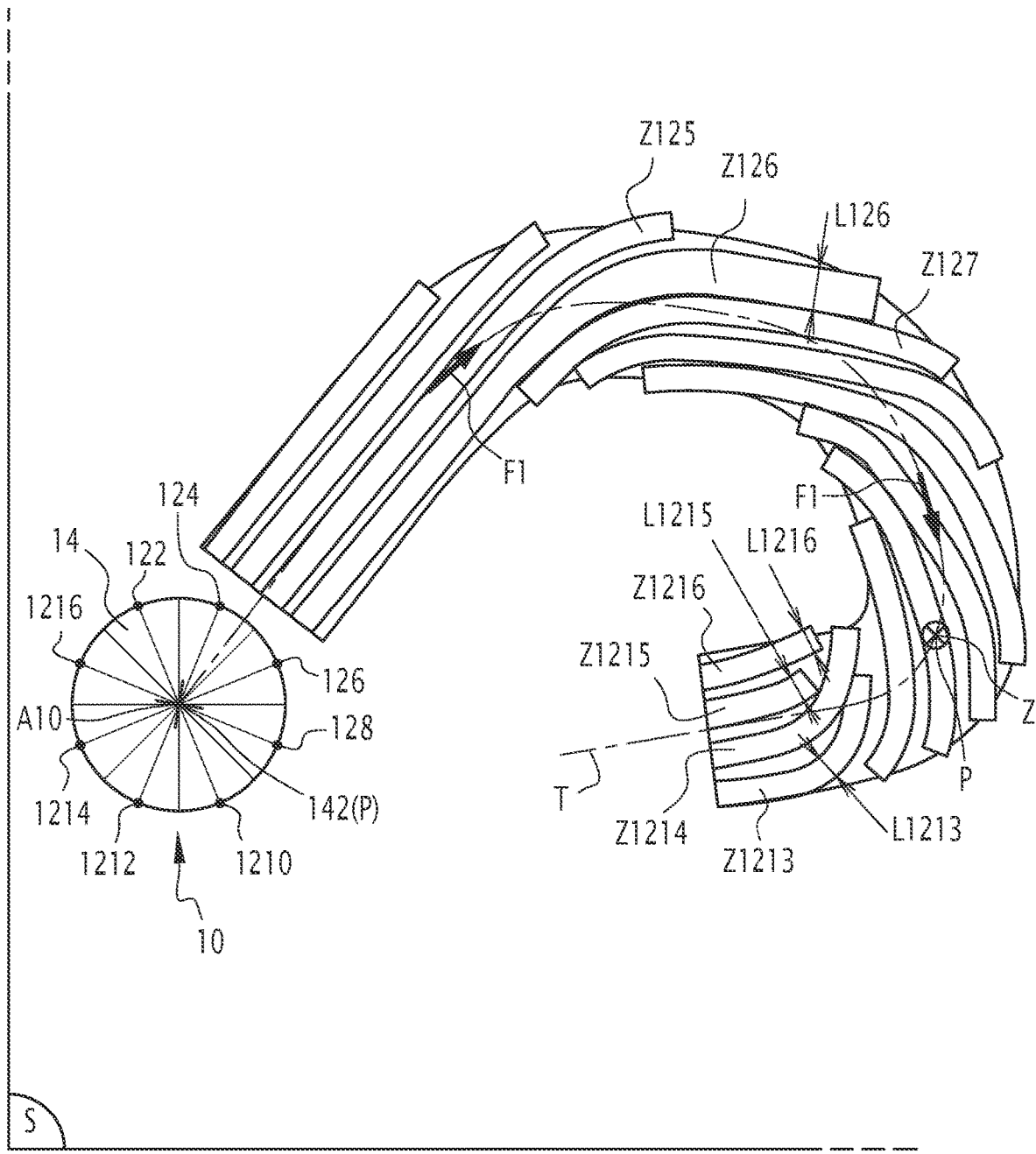
FIG. 8 is a representation analogous to FIG. 7, corresponding to an implementation of a sixth method according to the invention.

In the embodiments of FIGS. 7 and 8, body 14 of print head 10 holds sixteen nozzles 12$j$, with j ranging from 1 to 16, these nozzles being distributed around the periphery of a disk-shaped surface of body 14. In FIGS. 7 and 8, the area of bead C applied by nozzle 12$j$ is marked with reference Z12$j$, for j ranging between 1 and 16.

FIG. 7 shows that bead C, which has the same geometry as that shown in FIGS. 5 and 6, is made up of a succession of bead portions constituted by areas Z12$j$, which is possible thanks to selection of certain nozzles 12$j$, at each point of trajectory T, to constitute selected nozzles in the sense of selected nozzles 12A of the first embodiment, and to be activated at that point.

It may be seen that not all nozzles are used to form bead C. Indeed, no areas correspond to nozzle 121 or to nozzle 123 in FIG. 7.

It may be seen in FIG. 7 that a relatively large gap exists between areas 2125 and 2126, on the one hand, and between areas 2126 and Z127, on the other hand, on the outside of the first turn, while areas Z1213, Z1214, Z1215 and Z1216 overlap on the inside of the second turn.

In the case of sealant beads, the aim is to have a completely coated surface. In the case of adhesive or sound-proofing beads, an applicable volume is sought.

This problem is dealt with in the implementation of the method shown in FIG. 8, where width L126 of area Z126 is increased locally at the end of this area in the direction of print head movement along trajectory T, in order to avoid "gaps" in bead C. For this purpose, activation of nozzle 126 may be modified in the corresponding area outside the first turn, by increasing its activation frequency and/or the opening time of its ejection valve, for example.

Similarly, starting of nozzles 1213, 1214 and 1216 is delayed at the exit from the second turn, so as to apply only the coating product exiting from nozzle 1215 in this part of bead C, to avoid the overlap visible in FIG. 7, with this capable of resulting in bead C being too thick. Thus, in this part of bead C, width L1213, L1215, and L1216 of each area Z1213, Z1215, or Z1216 is temporarily reduced to zero, to account for the distance between these areas and adjacent area 21214, by reducing their activation frequency and/or duration of opening their ejection valves to zero, for example.

Similarly, the ending of an area Z12$j$ may be anticipated; i.e., its width reduced to zero, by reducing its activation frequency and/or the opening duration of its ejection valve to zero, for example, so as not to interfere with an adjacent area or areas.

According to one embodiment of the invention, not shown, the transition from zero width to a nominal width of an area Z12j may be gradual, by gradually varying the activation frequency and ejection duration of each nozzle, for example.

In the examples considered above, the coating area width of selected nozzles is adapted by adjusting the coating product output rate coming from each nozzle, which is controlled by the activation frequency and/or opening duration of the associated ejection valve.

The nozzle activation frequency may be controlled by a piezoelectric component or other comparable means, such as an electromagnetic valve.

Account is also taken in the methods of FIGS. 7 and 8 of the fact that the useful width L10 of print head 10 is greater than width LC of bead C, by inhibiting the activation of certain selected nozzles when they are not facing the track of bead C on the surface to be coated S. This is particularly the case for nozzles 121 and 128, which are located on the lateral edges of the print head in the part of trajectory T before the first turn.

Regardless of the embodiment, selecting nozzles 12A to be activated along trajectory T based on the trajectory direction makes it possible to adapt the application of coating product to the geometry of bead C to be made, while maintaining a relatively simple mode of movement of application head 10, thanks to the use of straight or circular translation without rotating the print head about its central axis or an axis parallel to it, such as the Z axis.

In the embodiments considered above, the selection of nozzles 12A and their activation are carried out automatically within electronic nozzle control unit 12, whether this unit is integrated into robot 20, such as the unit 30 of installation I of FIG. 1, or external to this robot.

In the case where surface S to be coated is warped; i.e., not flat, trajectory T is adapted and is not necessarily flat. In addition, print head 10 may pivot during movement about two transverse axes B10 and C10 defined by body 14 and perpendicular to axis A10 and between them. Also in this case, print head 10 does not rotate about its central axis A10, even though print head movement in the surface reference frame is not a simple combination of translations. This makes it possible to keep the surface of print head 10 on which nozzles 12 are mounted generally parallel to surface S to be coated for depositing a bead C on a curved area, such as the windshield attachment area identified in FIG. 1.

According to one variant of the invention, not shown, print head 10 is fixed and surface S to be coated is moved by a robot facing nozzles 12, with a straight or circular translation movement. In this case, in the reference frame of surface S, print head 10 and nozzles 12 move along a trajectory T. Also in this case, if electronic unit 30 does not know trajectory T in advance, the robot supporting the part to be coated may be equipped with an accelerometer or a central inertia unit, making it possible to reconstitute locally, in real time, trajectory T followed by print head 10 in the reference frame of surface S to be coated. Also in this case, as the print head is fixed, the robot is programmed to keep the average plane of the surface to be coated as parallel as possible to the plane of the nozzles defined by the surface of body 14 on which they are mounted.

Whether it is the surface or the print head that is fixed during the application, the robot used to ensure relative movement between the print head and the surface to be coated may be of any known type, such as multi-axis, as shown in FIG. 1, Scara or reciprocator type.

According to another variant of the invention, not shown, nozzles 12 or some of them are arranged in an arc of a circle, whereas body 14 is not circular in cross-section.

The invention is shown in the figures in cases where the print head has 8, 12, 16, 21 or 25 nozzles. It is applicable with other nozzle numbers, of whatever distribution pattern on body 14. However, a nozzle distribution in one or more arcs of a circle is particularly advantageous, as is apparent from the presentation of the second to sixth embodiments.

The invention is presented in the case where nozzles 12 are distributed in rows and columns or in an arc of a circle, but other distributions are conceivable, provided that the selected nozzles are in a line or are part of a group bounded by a line whose linear regression line is defined as mentioned above.

The embodiments and variants contemplated above may be combined with each other to generate new embodiments of the invention, within the scope of the attached claims.

The invention claimed is:

1. A method for applying a bead of coating product to a surface, by means of a print head equipped with a plurality of nozzles, each nozzle being centered on a central axis, the application of coating product taking place by moving the print head and the surface to be coated relative to each other by a relative print head movement along a curved trajectory, fixed in relation to the surface, without rotating the print head about an axis parallel to the central axes of the nozzles, the method comprising:
   selecting certain nozzles for a point of the trajectory based on the direction of the curved trajectory at this point and/or based on a previous point of the curved trajectory already reached by the print head and of the direction of the curved trajectory at this previous point;
   adapting the width of an area for coating coming from a selected and activated nozzle, based on the distance between this area and an adjacent area coming from another nozzle; and
   activating the selected nozzles at this point, wherein the selected nozzles are arranged in a line or are part of a nozzle group delimited by a line, the regression line of which coincides with a line perpendicular to the curved trajectory direction or as close as possible to a line perpendicular to the curved trajectory direction from among the lines that can be defined with the nozzles of the print head, wherein either:
   the nozzles of the print head are arranged in rows and columns and, during said selecting, the nozzles of a portion of certain rows and/or a portion of certain columns are selected together for activation; or
   the nozzles of the print head are arranged on at least one arc of a circle and that, during said selecting, the nozzles of a portion of the arc of a circle are selected together for activation.

2. The method according to claim 1, further comprising adapting the width of the coating area by varying an activation frequency of a feeder of the selected and activated nozzle.

3. The method according to claim 1, further comprising reducing locally the width of the coating area from the selected and normally activated nozzle to zero, so as not to interfere with adjacent coating product area(s).

4. The method according to claim 1, wherein the width of the print head, measured perpendicularly to the direction of the curved trajectory, is greater than or equal to the width of the bead to be applied, the width of the bead also being measured perpendicularly to the curved trajectory direction, and wherein, among the nozzles selected during said selecting, said activating only activates those nozzles arranged facing the track of the bead on the surface.

5. The method according to claim 1, further comprising supplying, by a control unit of a robot to an electronic control unit, information on the relative direction and speed of the print head in relation to the surface to be coated, allowing relative movement of the print head and the surface to be coated.

6. The method according to claim 1, further comprising supplying, by an accelerometer or an inertial unit embedded in a robot to an electronic control unit, information on the relative direction and speed of the print head in relation to the surface to be coated, allowing relative movement of the print head and the surface to be coated.

* * * * *